United States Patent
Ohashi et al.

(10) Patent No.: US 8,917,452 B2
(45) Date of Patent: Dec. 23, 2014

(54) OPTICAL DIFFUSION FILM

(75) Inventors: Yuki Ohashi, Osaka (JP); Tomoyuki Kitagawa, Osaka (JP); Naoto Niiya, Osaka (JP); Shinya Oishi, Osaka (JP)

(73) Assignee: Suntecopt Corporation, Osaka (JP)

( * ) Notice: Subject to any disclaimer, the term of this patent is extended or adjusted under 35 U.S.C. 154(b) by 567 days.

(21) Appl. No.: 13/080,822

(22) Filed: Apr. 6, 2011

(65) Prior Publication Data

US 2011/0249337 A1  Oct. 13, 2011

(30) Foreign Application Priority Data

Apr. 8, 2010  (JP) .................................. 2010-089078

(51) Int. Cl.
  *G02B 5/02*  (2006.01)
  *G02F 1/1335*  (2006.01)

(52) U.S. Cl.
  CPC ............ *G02B 5/0221* (2013.01); *G02B 5/0205* (2013.01); *G02B 5/0278* (2013.01); *G02F 1/133504* (2013.01)
  USPC .......................................... 359/599; 359/601

(58) Field of Classification Search
  CPC ........ G02B 5/01; G02B 5/0205; G02B 5/021; G02B 5/0221; G02B 5/0247; G02B 5/0278; G02B 5/0284; G02B 5/0289; G02B 5/0294
  USPC .......................................... 359/599, 601, 831
  See application file for complete search history.

(56) References Cited

U.S. PATENT DOCUMENTS

| | | | |
|---|---|---|---|
| 7,258,908 B2 * | 8/2007 | Kuwabara et al. ............ | 428/141 |
| 7,271,862 B2 * | 9/2007 | Matsunaga et al. ............ | 349/64 |
| 7,341,355 B2 * | 3/2008 | Namioka et al. ............... | 359/601 |
| 7,567,383 B2 * | 7/2009 | Nagahama et al. ........... | 359/599 |
| 2002/0057564 A1 | 5/2002 | Campbell et al. | |
| 2009/0002831 A1 | 1/2009 | Mikami et al. | |
| 2010/0097705 A1 * | 4/2010 | Furui et al. .................... | 359/599 |

FOREIGN PATENT DOCUMENTS

| | | |
|---|---|---|
| JP | 2001-154006 A | 6/2001 |
| JP | 2009-204837 A | 9/2009 |
| WO | 99/42861 A1 | 8/1999 |

OTHER PUBLICATIONS

Office Action dated Aug. 20, 2014 issued in corresponding Japanese patent application No. 2010-089078.

* cited by examiner

*Primary Examiner* — Thong Nguyen
(74) *Attorney, Agent, or Firm* — Heslin Rothenberg Farley & Mesiti P.C.

(57) ABSTRACT

Measurement reference lengths of length and width are set with respect to a convex structure, and an average of vertical distances between tip points and bottom points inside a measurement reference area is calculated as an average height. An average of horizontal distances between the tip points and bottom points is calculated as an average distance. A value obtained by dividing the average height by the average distance provides a gradient ratio. An inverse tangent of the gradient ratio provides an average gradient angle. When the average gradient angle ranges from 5 degrees to 15 degrees and a standard deviation of average gradient angle ranges from 30% to 40% of the average gradient angle, a regular reflectance at a regular reflection angle with respect to incident light of an angle of 30 degrees from a normal direction of the film surface is 1% or less.

8 Claims, 6 Drawing Sheets

PRIOR ART $$Ra = 0.2994 \times hm$$

$$Sm = Rm * \sin(\cos^{-1}((Rm-hm)/Rm))$$

$$\theta m = \tan^{-1}(hm/Sm)$$

$$hm = \sum_{i=1}^{n} hi/n \qquad Sm = \sum_{i=1}^{n} Si/n$$

$$L = \sum_{i=1}^{n} Si$$

STANDARD DEVIATION OF HEIGHT δh = ((Hp(80-0%)-Hp(20-0%))/1.68

Hp( 0%) = 0.000 um
Hp(10- 0%) = 2.704 um
Hp(20- 0%) = 2.893 um
Hp(30- 0%) = 3.013 um
Hp(40- 0%) = 3.111 um
Hp(50- 0%) = 3.204 um
Hp(60- 0%) = 3.299 um
Hp(70- 0%) = 3.402 um
Hp(80- 0%) = 3.524 um
Hp(90- 0%) = 3.706 um

Ra = 0.326 um

OPTICAL DIFFUSION FILM

CROSS REFERENCE TO RELATED APPLICATIONS

This application claims priority of Japanese application No. 2010-089078 filed on Apr. 8, 2010, the entire disclosure of this application being hereby incorporated herein by reference.

BACKGROUND OF THE INVENTION

1. Field of the Invention

The present invention relates to an optical diffusion film that is laminated on an upper surface or lower surface side of a liquid crystal panel in an optical display device such as a liquid crystal display unit.

2. Description of the Related Art

In an optical display device such as a liquid crystal display unit, a plurality of optical diffusion films are laminated on the top and bottom of a liquid crystal panel and used.

For example, International Publication No. WO 99/42861 discloses an optical diffusion film that includes structural members that vary in height along their length. In the optical diffusion film, the variations have a nominal period of less than forty times the nominal height of the structural members.

In the conventional optical diffusion film described above, although variations are provided in the lenticular heights, the variations are inadequate and do not have a diffusion effect. Consequently, there has been a problem regarding the occurrence of interference fringes or a wet-out phenomenon between laminated optical diffusion films or between an optical diffusion film and a liquid crystal panel, and there has also been a problem with a cut-off that is caused by a rapid change in brightness within a viewing angle. There has also been a problem of a decrease in a display quality such as occurrence of moiré that is caused by the relationship between a size of a light transmissive basic unit of the display panel and the periodicity of a lens pitch.

Further, in a conventional optical display device such as a liquid crystal display unit, it has been necessary to use a diffusion sheet as a protective sheet of a surface of an upper portion structure of an optical diffusion film, and to perform a diffusive matte treatment on a surface on an opposite side of a structured surface. However, forming these separate members or performing the matte treatment work requires labor man-hours and increased costs.

SUMMARY OF THE INVENTION

An object of the present invention is to provide an optical diffusion film which achieves a sufficient diffusion effect so that there is no occurrence of interference fringes and it is difficult for a wet-out phenomenon or a cut-off to occur, and which can maintain a display quality without requiring labor man-hours or costs associated with a diffusion sheet or a diffusive matte treatment or the like.

According to the present invention, by having a convex structure that enables diffusion over a wide range on a structural member surface of an optical diffusion film and that also has a high transmission image sharpness, emitted light and incident light on a structured surface as well as reflected light thereof is diffused over a wide range within a viewing angle, and a concealing property with respect to minute flaws of a structural member such as minute foreign substances or scratches can be improved by the diffusion effect.

According to one aspect of the present invention, an optical diffusion film comprising a resin film structural member is provided. The resin film structural member has, on a surface on at least one side thereof, a convex structure in which a plurality of convexities of irregular heights and sizes are continuously formed at random, without planar bottom portions between the convexities, and having tip points at highest points of the respective convexities and bottom points at lowest points at a periphery of the respective complexities.

An average of vertical distances between the respective tip points and bottom points comprises an average height (hm) and an average of horizontal distances between the respective tip points and bottom points provides an average distance (Sm). A gradient ratio (hm/Sm) is obtained by dividing the average height (hm) by the average distance (Sm). An average gradient angle (θm) comprises an inverse tangent value of the gradient ratio. A cross-sectional rectangular range is defined in which the average height (hm) and the average distance (Sm) are taken as one side in a vertical direction and another side in a horizontal direction.

According to the present invention, a range of the average gradient angle (θm) is from 5 degrees to 15 degrees. A standard deviation of the average gradient angle (θm) is within a range from 30% to 40% of the average gradient angle (θm). A regular reflectance of the optical diffusion film is 1% or less at a regular reflection angle with respect to incident light of an angle of 30 degrees from a normal direction of the film surface.

Further, when a total haze value, which is a sum of an internal optical haze value and an external optical haze value, is less than 10%, a diffuse reflectance at a first reflection angle that deviates by 20 degrees or more from the regular reflectance angle is 0.001% or less, and a diffuse reflectance at a second reflection angle that deviates by 30 degrees or more from the regular reflection angle is 0.0001% or less. When the total haze value is 10% or more, a diffuse reflectance at the first reflection angle is 0.05% or less and a diffuse reflectance at the second reflection angle is 0.0005% or less. Further, within a measurement reference area of the convex structure, when a proportion that air occupies with respect to the cross-sectional rectangular range is taken as a void ratio, the void ratio is 20% or more and less than 50%.

Within the measurement reference area of the convex structure, when a proportion that the convex structure occupies with respect to the cross-sectional rectangular range is taken as a resin ratio, the resin ratio is 50% or more and less than 80%.

In another aspect of the present invention, when the total haze value is less than 10%, the average gradient angle (θm) ranges from 5 degrees to 7.5 degrees, and a diffuse reflectance at the first reflection angle that deviates by 20 degrees or more from the regular reflection angle and a diffuse reflectance at the second reflection angle that deviates by 3.0 degrees or more from the regular reflection angle are 0.0005% or less and 0.00001% or less, respectively.

According to a further aspect of the present invention, an internal/external haze ratio which is a proportion of an internal haze value with respect to an external haze value is 20% or less when the total haze value is less than 10%, and is 15% or less when the total haze value is 10% or more; and a transmission image sharpness in accordance with JIS K7105 is 60% or more when the total haze value is less than 10%, and is 30% or more when the total haze value is 10% or more.

The invention further contemplates a method of fabricating the optical diffusion film wherein: the convex structure is produced by roll forming; the roll forming is performed by a molding surface that is produced by a sandblasting process;

the sandblasting process uses spherical beads; an average diameter of all of the spherical beads is from 30 to 90 µm; and a proportion obtained when a difference between a maximum diameter and a minimum diameter among all the spherical beads is divided by the average diameter is 40% or less.

The spherical beads may advantageously be made of a ceramic material.

Figure 2:
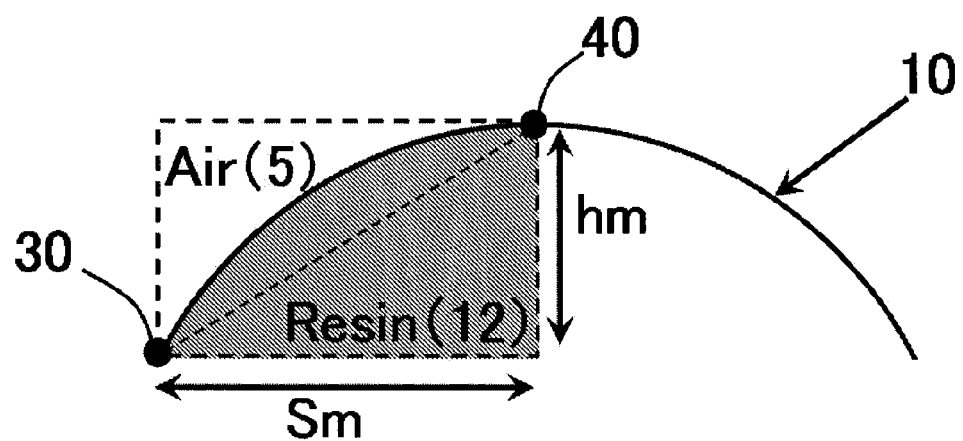
FIG. 2 is an explanatory view of a resin ratio and a void ratio when a cross-sectional rectangular range is applied to a convexity 10 of an example.
Figure 3:
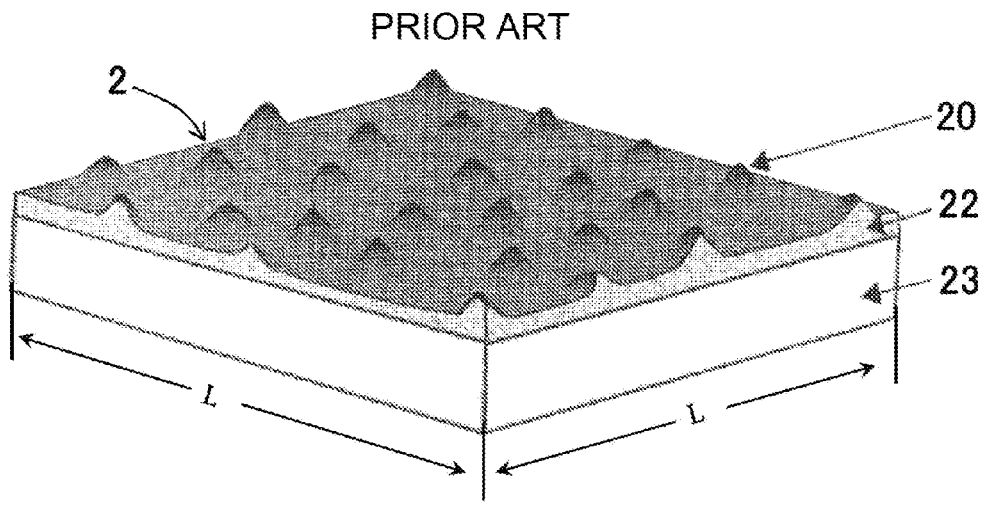
Figure 4:
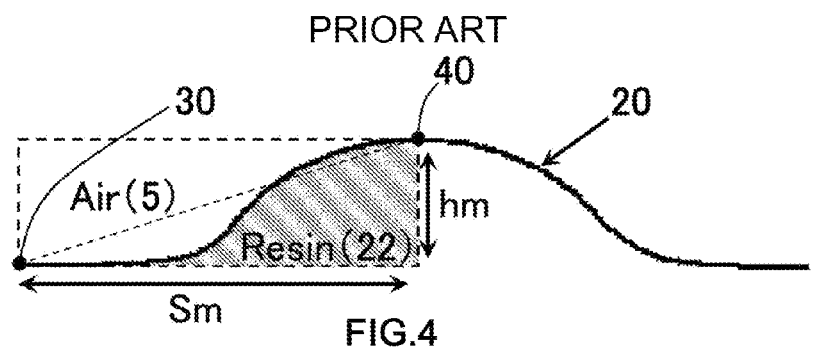
Figure 5:
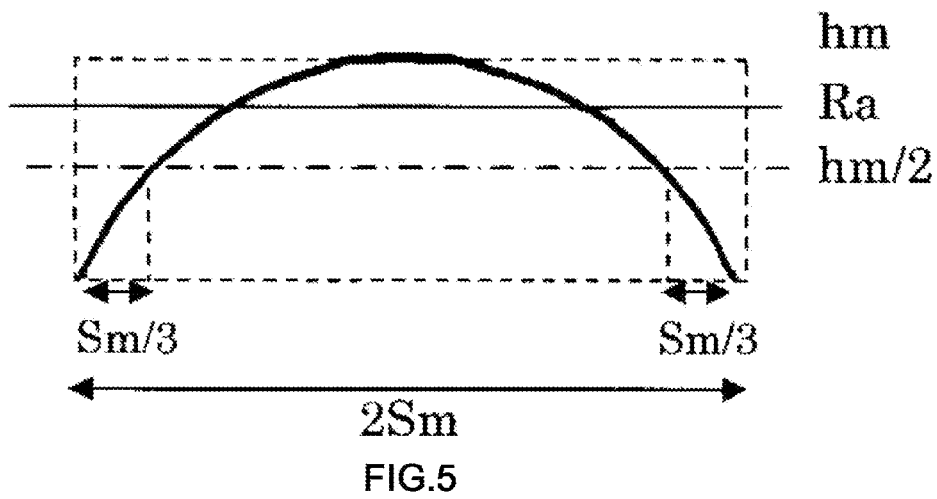
Figure 6:
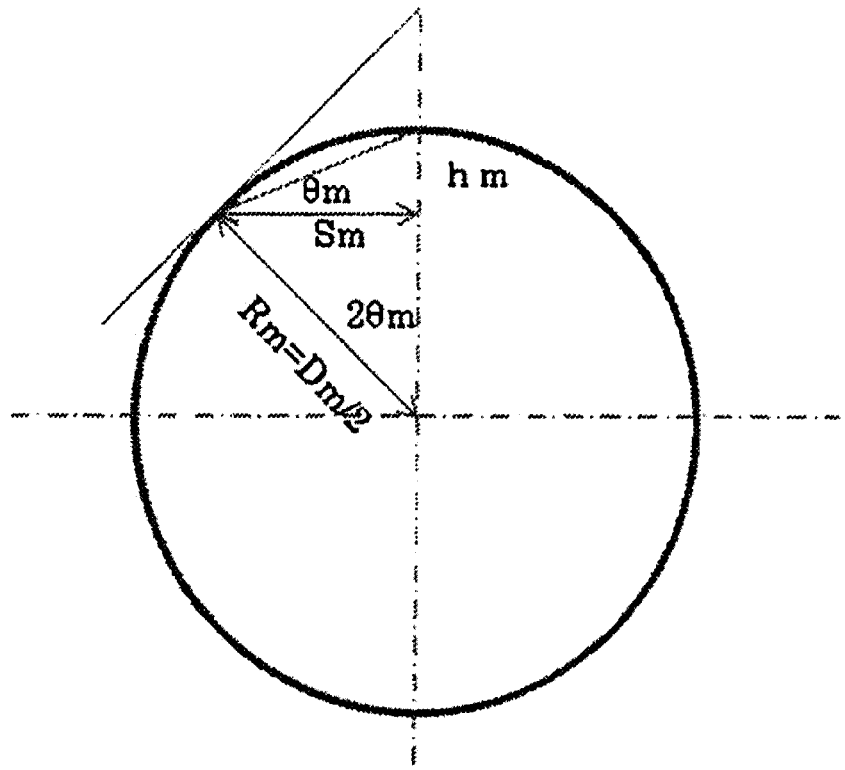
Figure 7:
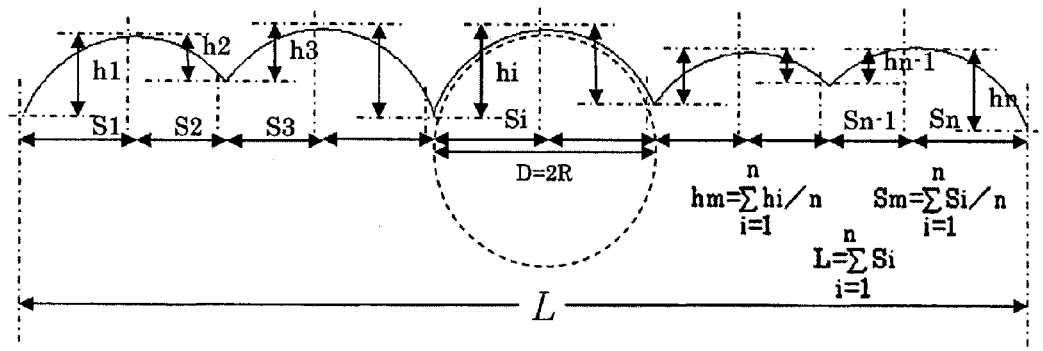
Figure 8:
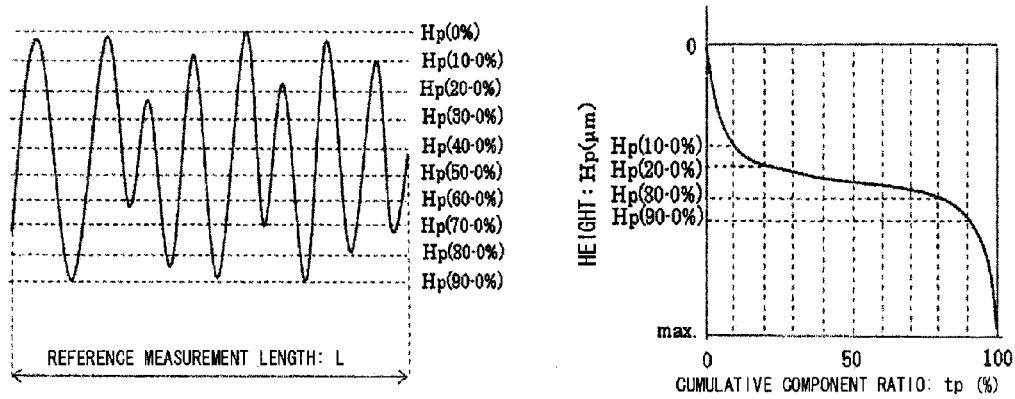
Figure 9:
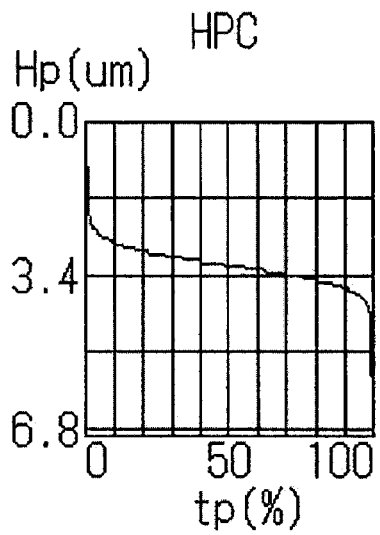
Figure 10:
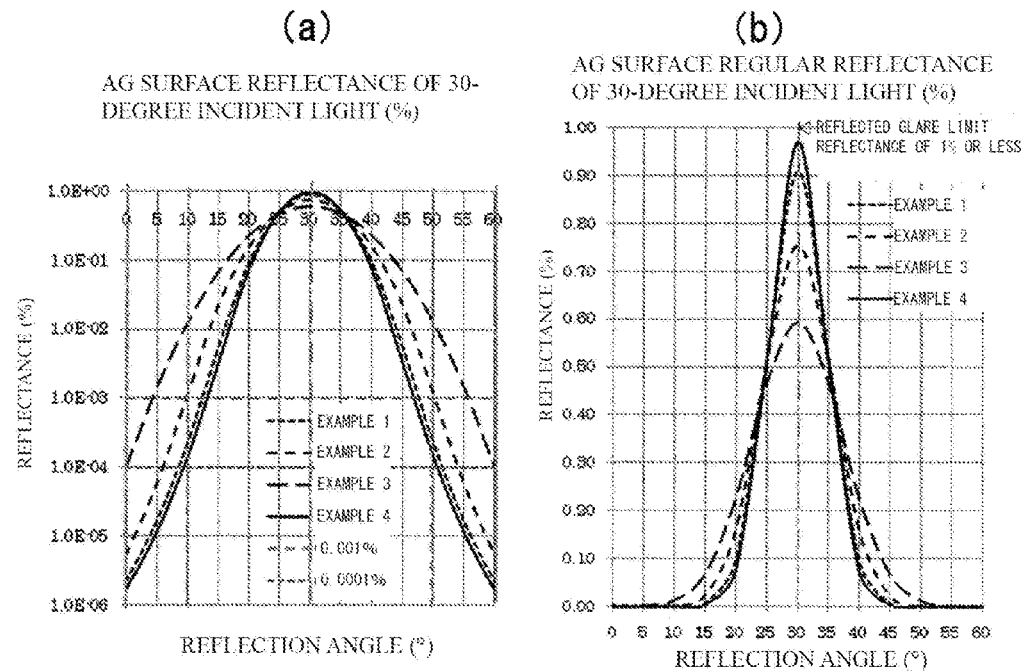
Figure 11:
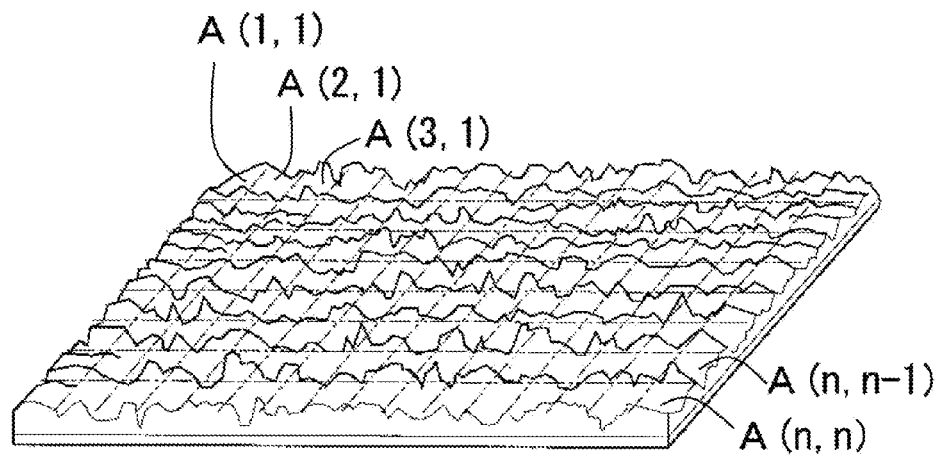
Figure 12:
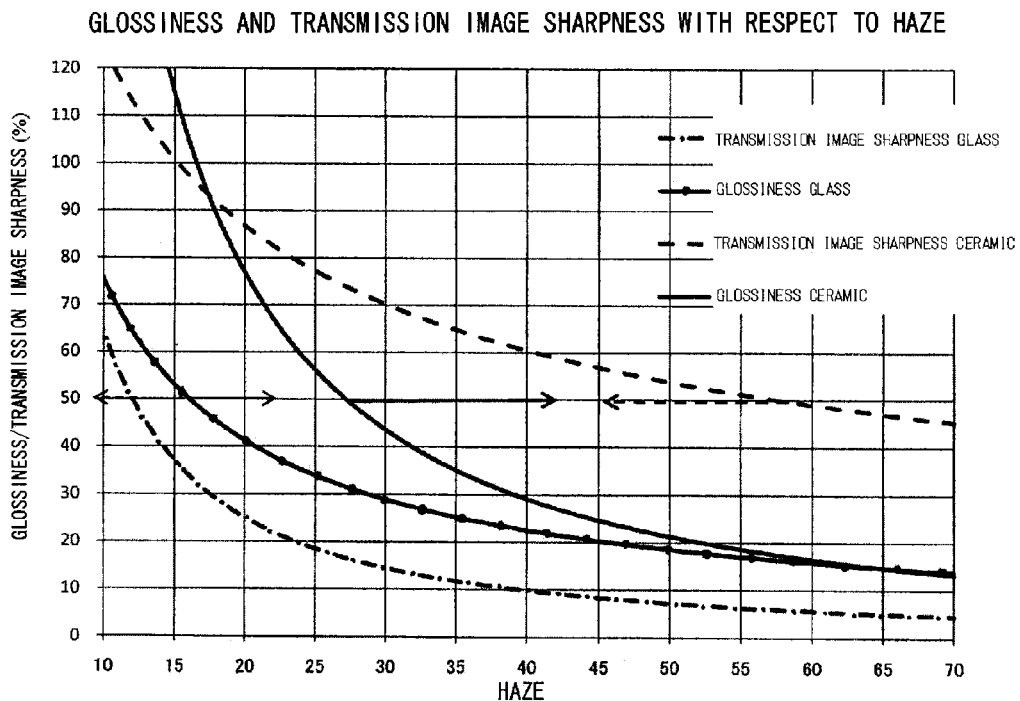
Figure 13:
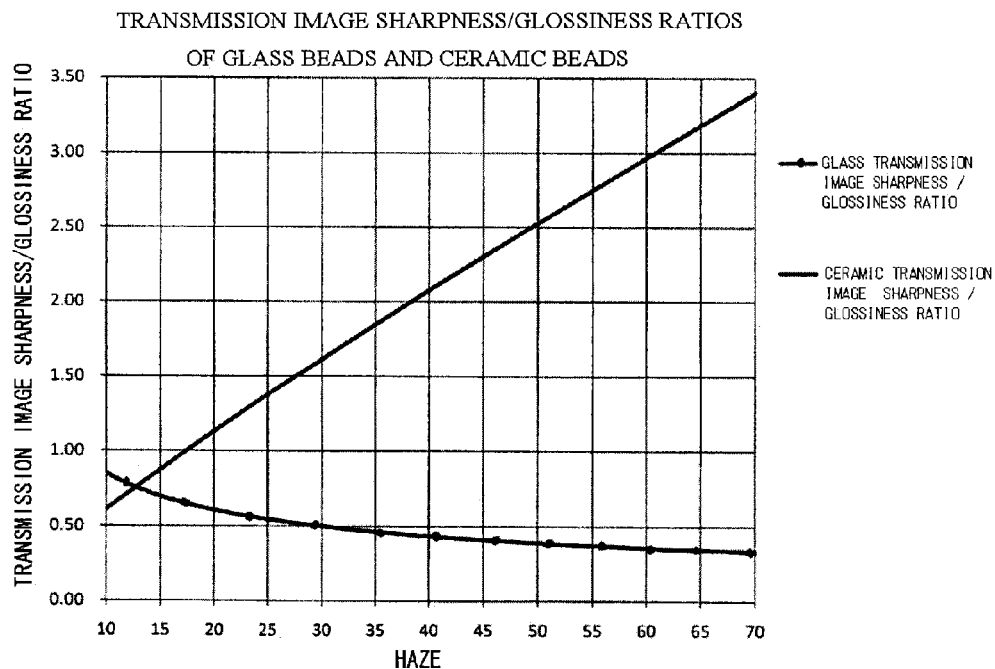

A resin ratio and a void ratio of a convex structure 11 can be calculated by means of the cross section illustrated in FIG. 2;

FIG. 3 is an enlarged perspective view of a supposed extracted portion from a conventional optical diffusion film 2. More specifically, FIG. 3 shows an optical film described in International Publication No. WO 99/42861;

FIG. 4 is an explanatory view of a resin ratio and a void ratio when a cross-sectional rectangular range that is the same as in FIG. 2 is applied with respect to a convexity 20 of the conventional technology. A resin ratio and a void ratio of a conventional convex structure 21 can be calculated by means of the cross section illustrated in FIG. 4;

FIG. 5 is an explanatory view that illustrates a relationship between an arithmetic average roughness (Ra) and an average height (hm) of a vertical cross-sectional shape of the convexity 10 according to an example;

FIG. 6 is an explanatory view that illustrates an interrelationship between spherical bead diameter, average height, an average distance, and an average gradient angle. In FIG. 6, reference characters Dm denote spherical bead diameter, reference characters Rm denote spherical bead radius, reference characters Sm denote average distance, reference characters ohm denote average height, and reference characters θm denote average gradient angle;

FIG. 7 is an explanatory view that illustrates a relationship between an average height and an average distance within a measurement length obtained by employing a spherical bead blasting process;

In FIG. 7, reference character L denotes measurement length, reference characters hm denote average height, and reference characters Sm denote average length;

FIG. 8 is a view that shows data illustrating a relationship between cumulative component ratio data for heights of convexities 10 and a standard deviation of an average height oh. More specifically, FIG. 8 shows a Height Pareto Chart (abbreviated as "HPC");

FIG. 9 shows HPC data of convexities 10 produced by a process that blasts spherical beads of an average spherical diameter of 54 µm according to Example 2. In FIG. 9, a JIS arithmetic average height Ra is 0.326, a refractive index of resin is 1.51, and a haze value is 13%;

FIG. 10 shows two graphs that illustrate a regular reflectance and a diffuse reflectance with respect to an angle of incidence of 30°, in which FIG. 10(a) is a graph illustrating a diffuse reflectance produced by 30-degree incident light of the optical diffusion film 1 according to an example, and FIG. 10(b) is a graph illustrating a regular reflectance produced by 30-degree incident light of the optical diffusion film 1 according to an example;

FIG. 11 is a perspective explanatory view illustrating an example of dividing a measurement range;

FIG. 12 is a graph that compares glossiness and transmission image sharpness with respect to haze; and FIG. 13 is a graph that compares transmission image sharpness/glossiness ratios with respect to haze.

DESCRIPTION OF THE PREFERRED EMBODIMENTS

Embodiment examples of the present invention are described in detail hereunder. An optical diffusion film 1 of the present invention has, on a surface on one side of the film, a convex structure 11 on which a plurality of convexities 10 whose heights and sizes are non-uniform are continuously formed at random in a manner that takes bottom portions 3 that extend to the respective peripheries thereof as a boundary, wherein the surface that has the convex structure 11 is formed by rolling compaction using a forming mold produced by blasting spherical particles.

Figure 1:
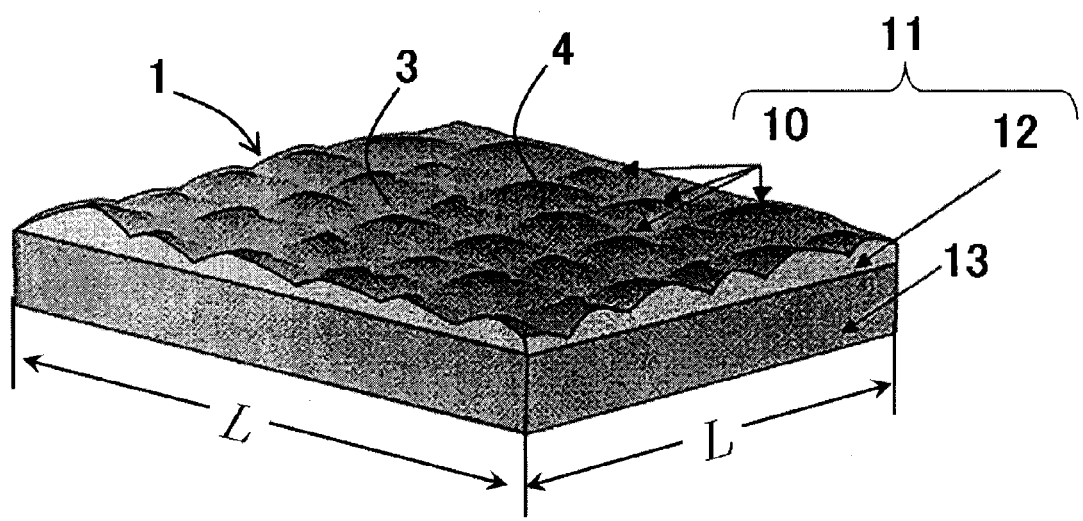
FIG. 1 is an enlarged perspective view that shows an extracted portion in a case where a reference measurement length L of an optical diffusion film 1 according to Example 1 is supposed, and an L×L square is extracted.

As shown in FIG. 1, in the optical diffusion film 1 produced by blasting spherical particles, the surface that has the convex structure 11 that includes a plurality of convex resin portions 12 is fixed to one side of a base film 13 of an even thickness. According to FIG. 1, it is supposed that an L×L square that takes a reference measurement length L (µm) as one side of the optical diffusion film 1 is extracted. On the surface that has the convex structure 11, a plurality of convexities 10 are continuously formed in every direction at a random size and a random height on an upper face thereof, and boundaries between respective convexities 10 are constituted by the bottom portions 3 that are branching continuous curves of random heights. The bottom portions 3 are all formed at a more upward portion than a boundary surface (upper surface of base film raw material) between the base film 13 and the convex resin portions 12, and unlike the convex structure 21 of the conventional optical diffusion film 2 (see FIG. 3 and FIG. 4), planar bottom portions 3 are not formed.

The conventional optical diffusion film 2 also includes convexities 20, convex resin portions 22, and a base film 23.

In this connection, a highest point 4 of each of the convexities 10 and 20 is taken as a tip point 40, and a lowest point at a periphery of each of the convexities is taken as a bottom point 30. An average of the distances in a vertical direction between the tip points 40 and the bottom points 30 is taken as an average height (hm), and an average of the distances in a horizontal direction between the tip points 40 and the bottom points 30 is taken as an average distance (Sm).

The surface that has the convex structure 11 is formed by a blast-formed mold. The blast-formed mold is formed by surface transfer molding by means of a transfer roll that has been blasted with blast particles that have a particle diameter of 70 µm or less. Consequently, the respective convexities 10 are an approximately spherical crown shape in accordance with the shape when the spherical particles (beads) are blasted. A bead structure is not included inside the film.

When forming a temporary mold by blasting, an operation in which a plurality of spherical particles whose particle sizes are within a predetermined range strike against the temporary mold at respectively different impact pressures is performed a plurality of times. Hence, a formed portion that has been formed once is subjected to another forming operation that partially overlaps with a forming operation that was previously performed. As a result, a temporary mold of convexities 10 is formed in which the heights, positions, and sizes of the convexities 10 are not uniform. A temporary mold, for example, is created by making forming holes in a metal roll that has a hardness between 475 and 575 HV by blasting with blast particles of a particle diameter between 30 and 63 μm.

As shown in FIG. 7, a surface that has the convex structure 11 formed by a blast-formed mold based on the temporary mold forms a cross section in which a plurality of circular arcs that take the bottom portions 3 that have random heights as a boundary are formed in succession in the cross-sectional width direction. The diameters, heights, and central angles of the plurality of circular arcs are randomly different. As shown in FIG. 2, each single convexity 10 among the circular arcs is defined by a supposed cross-sectional rectangular range in the vertical plane. The cross-sectional rectangular range is a supposed defined range that takes an average height (hm) and an average distance (Sm) as one side in a vertical direction and another side in a horizontal direction, respectively. When this cross-sectional rectangular range is supposed, a proportion of a constituent material of the convex structure 11 occupying the cross-sectional rectangular range is taken as a "resin ratio", and a proportion of the cross-sectional rectangular range occupied by a remaining air 5 region, which excludes the convex structure 11, is taken as a "void ratio".

When the rectangular range is applied to a convexity 10 that has a single tip point 40, the area within the range is divided into two parts that include a convex resin portion 12 at a lower part that includes the convexity 10, and the air 5 at a part that is above the convexity 10. An area proportion that the convex resin portion 12 occupies in this cross-sectional rectangular range is defined as a resin ratio (%), and an area proportion that the air 5 occupies is defined as a void ratio (%).

The sum of a resin ratio and a void ratio within a single cross-sectional rectangular range is always 100%, and because the convex resin portion 12 and the air 5 are marked off from each other by taking an upward-curving circular arc as a boundary as shown in FIG. 2, the resin ratio invariably exceeds 50%. In this connection, according to the conventional optical diffusion film 2, when a similar cross-sectional rectangular range is defined, as shown in FIG. 4, the resin ratio is less than 30% and the void ratio is greater than 70%.

When a resin ratio and a void ratio were measured over an entire area within a measurement reference area of the convex structure 11 of a predetermined size, it was found that a predetermined anti-glare effect is obtained by making an average value of the resin ratio 50% or more and less than 80%, and making an average value of the void ratio 20% or more and less than 50%.

The aforementioned term "anti-glare effect" refers to an effect that eliminates (anti) a glare phenomenon whereby a screen of a display device reflects daylight or fluorescent light. This effect is also referred to as an "anti-reflect effect".

As shown in FIG. 5, a relationship between an arithmetic average roughness (Ra) and an average height (hm) of a vertical cross-sectional shape of a single convexity 10 is expressed by Ra=0.2994×hm. A relationship between the average bead diameter (Dm), and the average height (hm), average distance (Sm) and average gradient angle (θm) of the convexities 10 is shown in FIG. 6. Further, a relationship between a reference measurement length L [μm] and an average height (hm) and average distance (Sm) is shown in FIG. 7. Furthermore, as shown in FIG. 8 as HPC (Height Pareto Chart) data, a relationship between cumulative component ratio data for heights of the convexities 10 and a standard deviation of the average height δh is that the standard deviation of height δH=((Hp (80–0%)-Hp (20–0%))/1.68. A data example in which this HPC data is applied to convexities 10 produced by blasting spherical beads that have an average spherical diameter (Dm) of 54 μm is illustrated in FIG. 9 as Example 2.

In the example (FIG. 9), based on height data for a reference measurement area of an L×L square evenly divided into 900 areas for which a refractive index of resin n is 1.51 and a measurement reference length L of the convex structure 11 is 115.5 μm produced by blasting spherical beads with a particle diameter of 45 to 63 μm and an average particle diameter (Dm) of 54 μm, according to FIG. 5 and Formula (1) below, convexities 10 that have a JIS arithmetic average roughness Ra of 0.326 μm and a haze value of 13% have an average height (hm) of 0.326/0.2994=1.089 μm. According to the example, a 100-μm square measurement area A1 is divided into respective divided areas a(1, 1), a(1, 2) . . . a(900, 900) of 900 rows×900 columns (see FIG. 11).

[Formula 1]

$$Ra = 0.2994(hm) \quad (1)$$

$$Ra = \int_0^{2Sm} hm|\text{SIN}(\pi x/2Sm) - 1/2| dx/2Sm =$$

$$\int_0^{Sm} hm|\text{SIN}(\pi x/2Sm) - 1/2| dx/Sm =$$

$$\int_0^{Sm/3} hm(1/2 - \text{SIN}(\pi x/2Sm)) dx/Sm +$$

$$\int_{Sm/3}^{Sm} hm(\text{SIN}(\pi x/2Sm) - 1/2) dx/Sm =$$

$$(2(\sqrt{3} - 1)/\pi - 1/6)hm = 0.2994hm$$

Further, based on the data shown in FIG. 9, it is found that the standard deviation σh of the height is (3.524–2.893)/1.68=0.375 μm, and based on the relationship shown in FIG. 6 the average distance (Sm) is 7.591 μm, the average gradient angle (θm) is 8.16°, and a standard deviation σθ of the average gradient angle (θm) is 2.81°. A regular reflectance R (30°) at a regular reflection angle with respect to an angle of incidence of 30° is 0.75%, and diffuse reflectances R (30±20°) and R (30±30°) of a first and second angle that deviate by 20° and 30° from the regular reflection angle are 0.0012% and 0.0000054%, respectively.

Further, a ratio of the standard deviation with respect to an average gradient angle (θm) of a haze value of 13% with respect to a film produced by means of the above described spherical blast particles is 66% for a 37% resin ratio, and 34% for the void ratio. The convexities 10 produced by blasting the spherical beads form a shape of a thin-walled, micro-convex lens that has a long focal distance, and have poor light-harvesting properties. Accordingly, the convexities 10 are effective for enhancing total light transmittance and transmission image sharpness.

FIG. 10 shows a regular reflectance and a diffuse reflectance caused by 30-degree incident light of the optical diffusion film 1 with a convex structure refraction index n of 1.51 that is produced by the above described spherical bead blasting. A regular reflectance of 1% indicates a glare or reflected glare limit. A reflectance of 0.001% of a first reflection angle as an angle that deviates by ±20° from the regular reflection angle and a reflectance of 0.0001% of a second reflection angle as an angle that deviates by ±30° from the regular reflection angle respectively indicate a white blurring limit. Since a mirror reflectivity at a regular reflection angle with respect to light at a 30-degree angle of incidence of a flat resin surface with a refraction index n of 1.51 is 4.28%, it can be said that a favorable anti-reflection effect is obtained at a regular reflectance of 1% and below according to the examples.

Results with respect to the above described examples are shown in Table 1. Example 4 is a simulation result for the optical diffusion film 1 that is designed based on the data of Examples 1 to 3 so that transmission image sharpness is extremely high at 80% or more, there is almost no white blurring with R (30±20°)≤0.0005%, and reflected glare is also not a concern with a value for R (30°)≤1%. As in Example 3, preferably the haze value of the overall film is from 20% to 35%, and the transmission image sharpness according to JIS K7105 is 30.0 to 49.0%. Further, according to Example 3, a proportion of an internal optical haze value of convexities 10 included in the convex structure 11 relative to an external optical haze value of the convex structure 11 (internal/external haze ratio) is 15% or less. Specifically, this indicates an effect whereby a haze value generated by internal diffusion of the convexities 10 is suppressed and an external haze value is the main optical haze value. Based on transmission image sharpness and glossiness data, the best result in which an anti-glare effect was achieved by using ceramic beads was a haze of 40% or more, a transmission image sharpness of 60% or more, a glossiness of 30% or less, and an total light transmittance of 91% or more.

increases linearly from the vicinity of 0.60. Accordingly, ceramic beads enable formation of a film that has a high level of transmission image sharpness, a low level of glossiness, and a high level of total light transmittance at a medium haze. As can be understood from the haze range, when blasting of glass beads is used for production, a film does not exert a high level of transmission image sharpness or an anti-glare effect of a low level of glossiness.

FIG. 13 is a graph that shows transmission image sharpness/glossiness ratios with respect to haze for glass and ceramic beads. Based on this graph it is found, with respect to haze values, glass beads and ceramic beads exhibit opposite "transmission image sharpness/glossiness" characteristics to each other.

"Transmission image sharpness/glossiness" is an important index in anti-glare evaluation. The "transmission image sharpness/glossiness" of an optical diffusion sheet manufactured by means of a transfer roll that has been blasted with glass beads decreases accompanying a haze value increase. However, "transmission image sharpness/glossiness" in a case where the transfer roll has been blasted with ceramic beads improves accompanying a haze value increase. More specifically, when a transfer roll that has been blasted with ceramic beads is used, the optical diffusion film 1 that has characteristics including a high level of transmission image

TABLE 1

| Item | Unit | Example 1 | Example 2 | Example 3 | Example 4 |
|---|---|---|---|---|---|
| Blast beads diameter | μm | 45 to 63 | 45 to 63 | 45 to 63 | 45 to 63 |
| Refractive index of resin |  | 1.51 | 1.51 | 1.51 | 1.51 |
| Haze value: Hz | % | 9 | 13 | 28 | 6 |
| JIS arithmetic average roughness: Ra | μm | 0.223 | 0.326 | 0.544 | 0.195 |
| Average height: (hm) | μm | 0.746 | 1.089 | 1.817 | 0.650 |
| Standard deviation δh | μm | 0.257 | 0.375 | 0.615 | 0.244 |
| Average distance: (Sm) | μm | 6.303 | 7.591 | 9.737 | 5.889 |
| Average gradient angle (θm) | ° | 6.75 | 8.16 | 10.57 | 6.30 |
| Standard deviation: δθ | ° | 2.32 | 2.81 | 3.58 | 2.17 |
| Regular reflectance: R (30°) | % | 0.91 | 0.75 | 0.59 | 0.97 |
| Diffuse reflectance: R (30 ± 20°) | % | 0.00023 | 0.0012 | 0.0012 | 0.00014 |
| Diffuse reflectance: R (30 ± 30°) | % | 0.0000021 | 0.0000054 | 0.0098 | 0.0000017 |
| Void ratio | % | 33 | 34 | 31 | 35 |
| Transmission image sharpness | % | 73 | 50.1 | 32 | 93 |
| Regular reflectance reflected glare evaluation |  | G | G | E | G |
| Diffuse reflectance white blurring evaluation |  | G | F | P | E |

The meaning of the evaluation symbols is P: Poor, a serious concern; F: Fair, a slight concern; G: Good, not a concern; E: Excellent, absolutely not a concern. An evaluation of G or better is a level at which there is no problem.

(Spherical Particles)

A comparison test was conducted for a surface having the convex structure 11 with respect to original molds produced by three kinds of beads as spherical particles to be used for a blasting process. The three kinds of beads were small ceramic beads (particle diameter 30 to 63μ), large glass beads (particle diameter 63 to 90μ), and small glass beads (particle diameter 45 to 63μ). A concept according to the present specification is that glass is a non-crystal substance and ceramic is a substance that is made by assembling a crystalline material. With regard to comparing glossiness and transmission image sharpness with respect to haze, as shown in FIG. 12, a haze range of ceramic beads for which transmission image sharpness is 50% or more and glossiness is 50% or less is 27≤Hz≤57. In contrast, there was no haze range for the glass beads (see arrow of plotted line on left of graph in FIG. 12). Further, with regard to comparing transmission image sharpness/glossiness ratios with respect to haze, as shown in FIG. 13, it was found that in the case of glass beads the ratio decreases in a range that is less than 1.00 accompanying a haze increase, while in the case of ceramic beads the ratio sharpness, a low level of glossiness, and a high level of total light transmittance at a medium haze can be manufactured. As a result, the optical diffusion film 1 has an anti-glare effect.

Based on the foregoing, it is found that when blast particles for performing surface transfer formation of a surface that has the convex structure 11 are composed of ceramic resin with a particle diameter of 30 to 63 μm and a surface that receives an impact of the blast particles to form an original mold is composed by a nickel-plated plate with a hardness of 525±10 HV, the haze value of the entire film is from 32 to 35%, and furthermore, the transmission image sharpness in accordance with JIS K7105 is 46 to 49% and the image clarity (image sharpness) shows a high tendency. Thus, a characteristic of the optical diffusion film 1 of the present invention is that the optical diffusion film 1 suppresses internal diffusion of the convex resin portions 12 that have a high level of transmission image sharpness and diffuses light in a manner that takes an external haze value as the main haze value. A further characteristic of the optical diffusion film 1 of the present invention is the inside of the convex resin portions 12 do not include a filler such as diffusing particles. On the other hand, in the case of glass beads, it was found that a resulting film is suited for use as a soft matte that has an anti-dazzling property and a concealing property of a high level. The term "soft matte" refers to, for example, a sheet that prevents display contents of a display device from being seen by another person that is looking at the display device from the left or right side.

(Proportion of Divided Areas Having Divided Area Height Greater than or Equal to Average Value)

The optical diffusion film 1 manufactured using a transfer roll that was blasted with ceramic beads has the following composition.

As shown in FIG. 11, when a measurement area A1 of a height of the convex structure 11 is divided into respective divided areas a(1, 1), a(1, 2) . . . a(n, n) of n rows and n columns and the heights of the respective divided parts are taken as h(1, 1), h(1, 2) . . . h(n, n), with respect to the convexities 10 forming the convex structure 11, a proportion of the total measured area that is occupied by the sum total of divided areas for which the height of the respective divided parts is greater than or equal to the average value ranges from 40% to 60%. Further, as an optical haze value an internal haze value of the convex resin portions 12 is 15% or less with respect to an external haze value of the convex resin portion structured surface (external haze value is 85% or more).

What is claimed is:

1. An optical diffusion film comprising a resin film structural member,
    the resin film structural member having, on a surface on at least one side thereof, a convex structure in which a plurality of convexities of irregular heights and sizes are continuously formed at random, without planar bottom portions between the convexities, and having tip points at highest points of the respective convexities and bottom points at lowest points at a periphery of the respective convexities,
    an average of vertical distances between the respective tip points and bottom points being taken as an average height (hm) and an average of horizontal distances between the respective tip points and bottom points being taken as an average distance (Sm),
    a gradient ratio (hm/Sm) being obtained by dividing the average height (hm) by the average distance (Sm),
    an average gradient angle (θm) being taken as an inverse tangent value of the gradient ratio (hm/Sm);
    a cross-sectional rectangular range being defined in which the average height (hm) and the average distance (Sm) are taken as one side in a vertical direction and another side in a horizontal direction, respectively;
    wherein:
    a range of the average gradient angle (θm) is from 5 degrees to 15 degrees;
    a standard deviation of the average gradient angle (θm) is within a range from 30% to 40% of the average gradient angle (θm);
    a regular reflectance of the optical diffusion film is 1% or less at a regular reflection angle with respect to incident light of an angle of 30 degrees from a normal direction of the film surface;
    when a total haze value, which is a sum of an internal optical haze value and an external optical haze value, is less than 10%, a diffuse reflectance at a first reflection angle that deviates by 20 degrees or more from the regular reflection angle is 0.001% or less, and a diffuse reflectance at a second reflection angle that deviates by 30 degrees or more from the regular reflection angle is 0.0001% or less; and
    when the total haze value is 10% or more, a diffuse reflectance at the first reflection angle is 0.05% or less and a diffuse reflectance at the second reflection angle is 0.005% or less; and
    within a measurement reference area of the convex structure, when a proportion that air occupies with respect to the cross-sectional rectangular range is taken as a void ratio, the void ratio is 20% or more and less than 50%.

2. The optical diffusion film according to claim 1, wherein: when the total haze value is less than 10%, the average gradient angle (θm) ranges from 5 degrees to 7.5 degrees, and a diffuse reflectance at the first reflection angle that deviates by 20 degrees or more from the regular reflection angle and a diffuse reflectance at the second reflection angle that deviates by 30 degrees or more from the regular reflection angle are 0.0005% or less and 0.00001% or less, respectively.

3. The optical diffusion film according to claim 1,
    wherein, within a measurement reference area of the convex structure, when a proportion that the convex structure occupies with respect to the cross-sectional rectangular range is taken as a resin ratio, the resin ratio is 50% or more and less than 80%.

4. The optical diffusion film according to claim 3, wherein: when the total haze value is less than 10%, the average gradient angle (θm) ranges from 5 degrees to 7.5 degrees, and a diffuse reflectance at the first reflection angle that deviates by 20 degrees or more from the regular reflection angle and a diffuse reflectance at the second reflection angle that deviates by 30 degrees or more from the regular reflection angle are 0.0005% or less and 0.00001% or less, respectively.

5. The optical diffusion film according to claim 4, wherein: an internal/external haze ratio which is a proportion of an internal haze value with respect to an external haze value is 20% or less when the total haze value is less than 10%, and is 15% or less when the total haze value is 10% or more; and a transmission image sharpness in accordance with JIS K7105 is 60% or more when the total haze value is less than 10%, and is 30% or more when the total haze value is 10% or more.

6. The optical diffusion film according to claim 1, wherein:
    an internal/external haze ratio which is a proportion of an internal haze value with respect to an external haze value is 20% or less when the total haze value is less than 10%, and is 15% or less when the total haze value is 10% or more; and
    a transmission image sharpness in accordance with JIS K7105 is 60% or more when the total haze value is less than 10%, and is 30% or more when the total haze value is 10% or more.

7. A method of fabricating the optical diffusion film according to claim 1, wherein:
    the convex structure is produced by roll forming;
    the roll forming is performed by a molding surface that is produced by a sandblasting process;
    the sandblasting process uses spherical beads;
    an average diameter of all of the spherical beads is from 30 to 90 μm; and
    a proportion obtained when a difference between a maximum diameter and a minimum diameter among all of the spherical beads is divided by the average diameter is 40% or less.

8. The method according to claim 7, wherein the spherical beads are made of a ceramic material.

* * * * *